United States Patent [19]
Hardingham

[11] 3,774,048
[45] Nov. 20, 1973

[54] ENERGY GENERATING AND STORING ASSEMBLY FOR MARINE STRUCTURE

[76] Inventor: Derek D. Hardingham, 1030 Crest View Dr., Seal Beach, Calif. 90740

[22] Filed: Feb. 22, 1972

[21] Appl. No.: 228,037

[52] U.S. Cl............ 290/42, 290/53, 115/4, 114/39
[51] Int. Cl............................. F03b 13/12
[58] Field of Search............ 9/8; 115/4; 240/42, 240/43; 114/53, 54, 39; 417/330, 331, 332, 333

[56] References Cited
UNITED STATES PATENTS

| | | | |
|---|---|---|---|
| 3,185,873 | 5/1965 | Rosenfeld | 322/4 |
| 3,231,749 | 1/1966 | Hinck | 240/53 |
| 666,456 | 1/1901 | Banning | 115/5 |
| 2,452,973 | 11/1948 | Weir | 417/331 X |
| 1,682,176 | 8/1928 | Hegenburth | 115/4 |
| 3,603,804 | 9/1971 | Casey | 417/332 |
| 373,086 | 10/1887 | Runk | 115/5 |

FOREIGN PATENTS OR APPLICATIONS

| | | | |
|---|---|---|---|
| 409,761 | 2/1925 | Germany | 290/53 |
| 21,336 | 3/1911 | Great Britain | 115/5 |

Primary Examiner—G. R. Simmons
Attorney—William C. Babcock

[57] ABSTRACT

A device and method of using same for transforming the pitch and roll motion of a buoyant marine structure into storable energy that is available for future use.

13 Claims, 10 Drawing Figures

PATENTED NOV 20 1973　　3,774,048

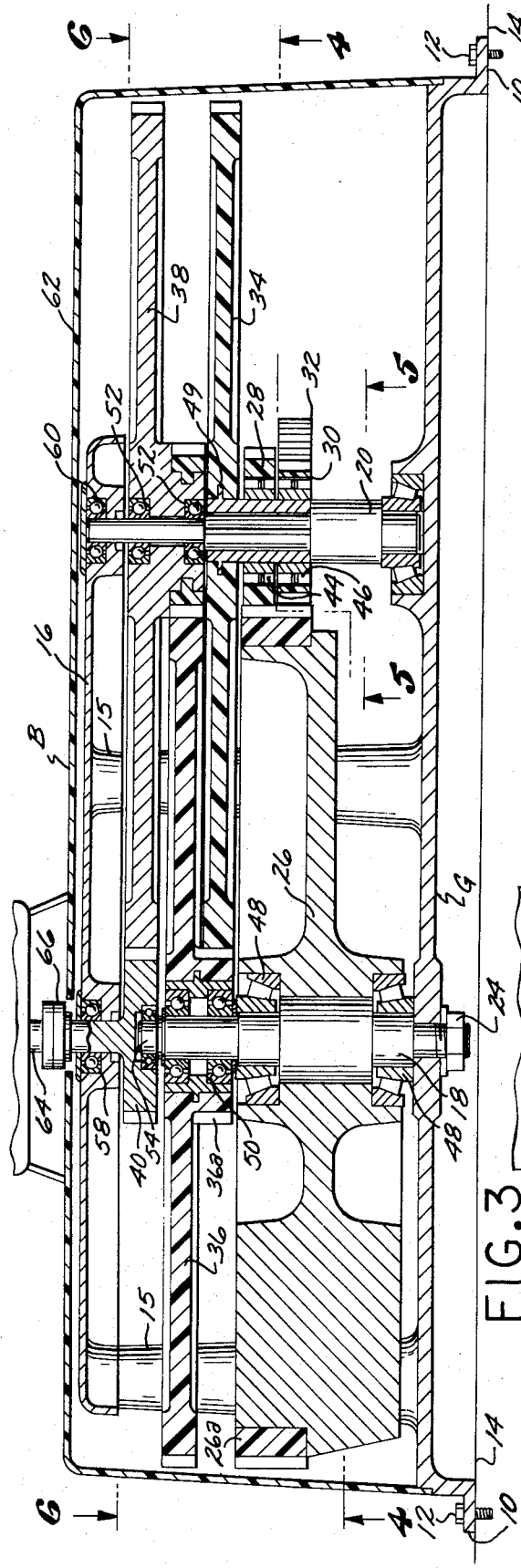

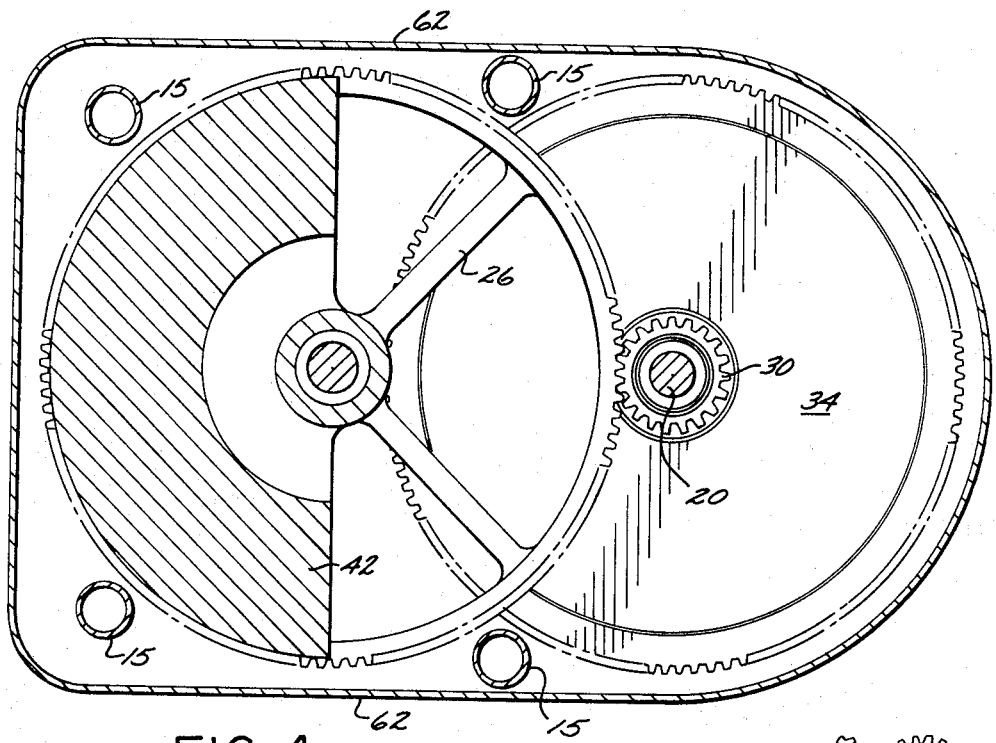
FIG. 4
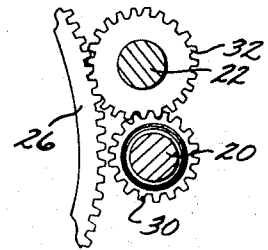
FIG. 5
FIG. 6
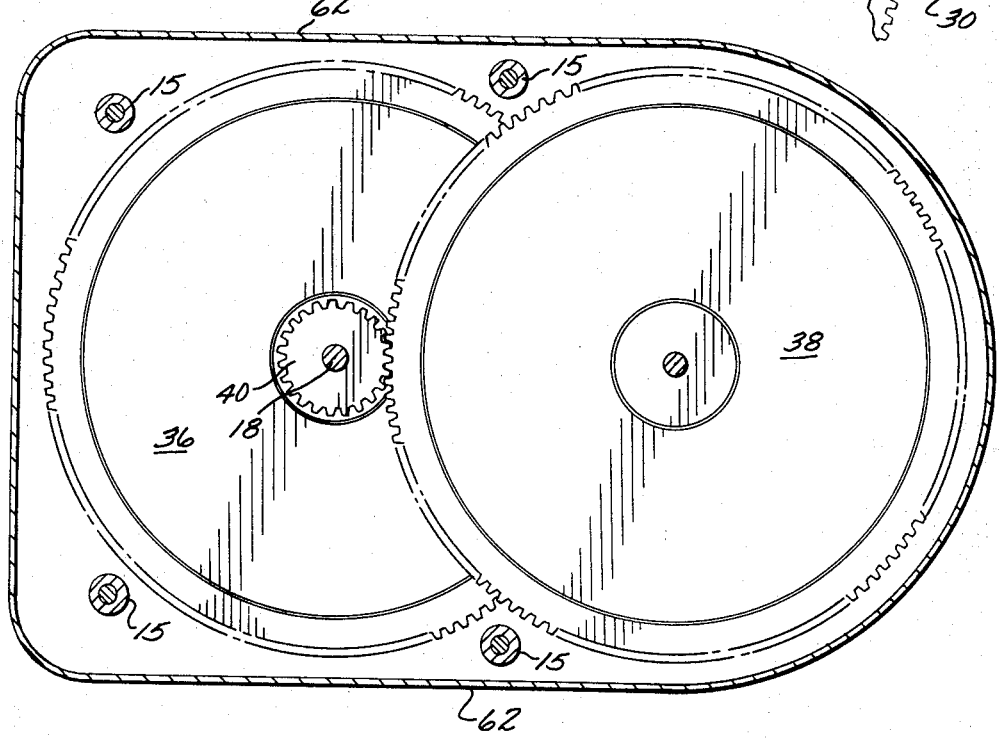

ENERGY GENERATING AND STORING ASSEMBLY FOR MARINE STRUCTURE

BACKGROUND OF THE INVENTION

1. Field of the Invention

An energy generating and storing assembly for a buoyant marine structure that is actuated by the pitch and roll motion of the latter.

2. Description of the Prior Art

Owners of power bolts as well as sailing vessels that are provided with auxilliary engines, must periodically operate the latter to drive generators to maintain storage batteries on the boat or vessel in a charged condition. If the batteries are used as a source of electrical energy for lights, engine starting purposes, and the like, it will be apparent that the engines must be operated relatively frequently, which is not only annoying and an inconvenience to the owner, but is relatively expensive if the engine is of substantial horsepower.

The primary purpose in devising the present invention is to provide a device in which the pitch and roll motion of the buoyant marine structure is utilized to oscillate a pivotally supported, off-centered weight, with the oscillating motion of the weight being transformed into relatively high speed motion in a single direction that is used to drive an electric generator, air or gas compressor, pump, or the like, whereby electric energy or gas under pressure may be stored for future use. Operation of the device occurs automatically as the marine structure on which it is installed pitches and rolls, and with no expense to the owner.

The device is particularly adapted for installation in hollow buoys that are located in remote and hard-to-reach locations, with the device, as the buoy pitches and rolls, generating electricity to charge storage batteries in the buoy and the charged batteries serving as a source of electrical energy to operate lights mounted on the buoys. From experience, it has been found that the device operates satisfactorily even when the marine structure on which it is installed is subjected to but slight pitch and roll motion.

SUMMARY OF THE INVENTION

A device that is secured in a fixed position relative to a buoyant marine structure that is subjected to pitch and roll motion. The device includes a pivotally supported, off-centered weight that oscillates as a result of said motion, and this oscillating motion, by gear means, being transformed into rotary motion in a single direction. The rotary motion in a single direction is used to drive a generator, compressor, pump, or the like to store energy that may subsequently be used for desired electrical or mechanical purposes. The gear means, in addition to transforming the oscillatory motion into rotary motion in a single direction, also provides this rotary motion at a substantially greater angular velocity than that at which said weight oscillates.

A major object of the invention is to provide a power-generating device that is automatically actuated by the pitch and roll of a buoyant marine structure on which the device is installed, and the power so generated being used to store electrical or pneumatic energy for future use on the structure.

Another object of this invention is to furnish a lightweight, compact device of relatively simple mechanical structure that is easily and conveniently installed on a marine structure, and after installation will automatically maintain storage batteries on the structure in a charged condition due to the pitch and roll motion to which the structure is subjected.

BRIEF DESCRIPTION OF THE DRAWINGS

FIG. 3 is a longitudinal cross-sectional view of a first form of the device;

FIG. 4 is a fragmentary, longitudinal cross-sectional view of the first form of the device taken on the line 4—4 of FIG. 3;

FIG. 5 is a fragmentary, longitudinal cross-sectional view of the first form of the device taken on the line 5—5 of FIG. 3;

FIG. 6 is a longitudinal cross-sectional view of the first form of the device taken on the line 6—6 of FIG. 3;

FIG. 7 is a longitudinal cross-sectional view of a second form of the device;

DESCRIPTION OF THE PREFERRED EMBODIMENTS

Figure 1:
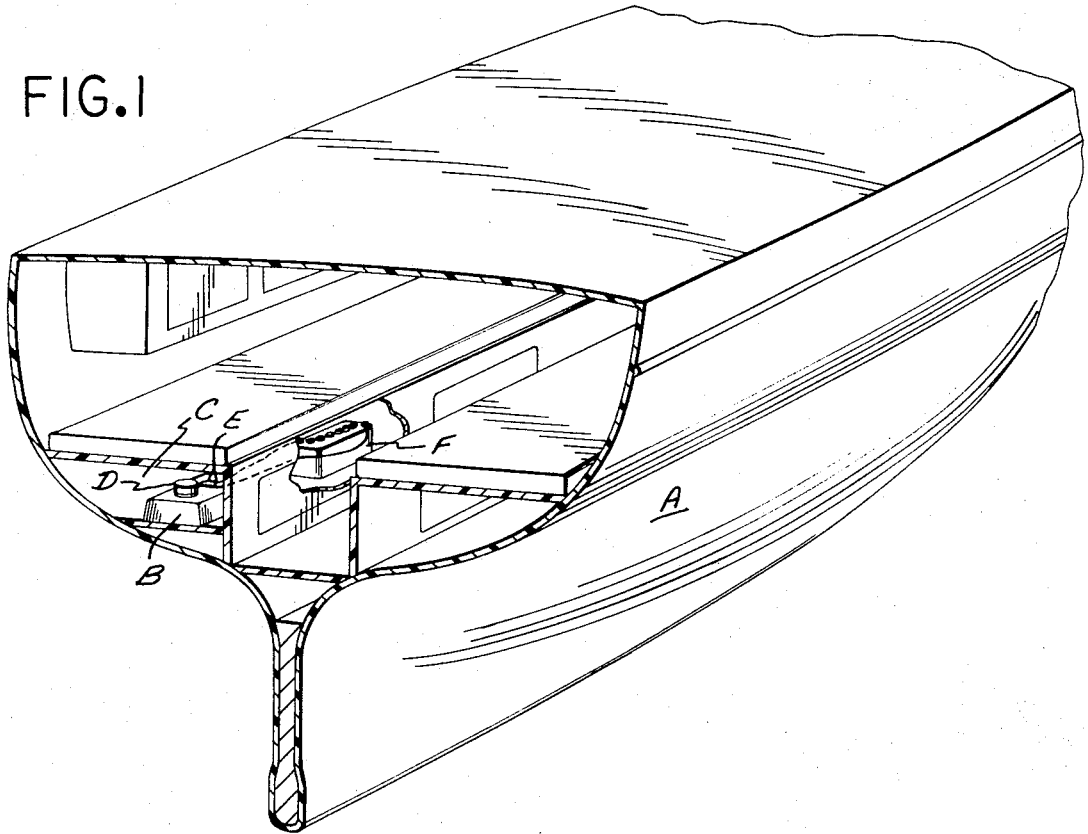
FIG. 1 is a perspective view of a portion of a marine vessel that is cut away to show a possible positioning of the power generating device within the interior thereof.
Figure 2:
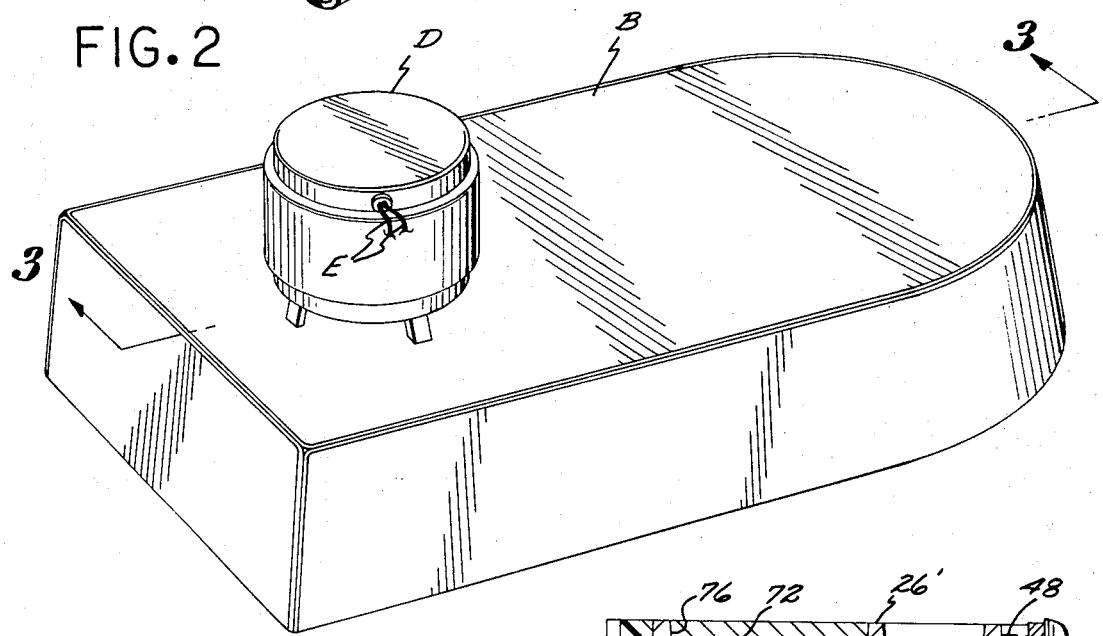
FIG. 2 is a perspective view of the device.

A conventional buoyant marine vessel A is shown in FIG. 1 that is subjected to pitch and roll movement when subjected to wave action. The invention B that is illustrated as mounted in a compartment C in the vessel A, when vessel A is subjected to pitch and roll motion, is actuated to drive an alternator D to discharge electric current through conductors E to charge storage batteries F. The first form B-1 of the invention, as illustrated in FIGS. 3 to 6 inclusive, includes an elongate base G that has lugs or a flange 10 projecting outwardly therefrom through which bolts 12 extend to engage a flat, horizontal surface portion 14 of the vessel A, as shown in FIG. 3.

A number of spaced uprights 15 are secured to base G and serve to support a plate 16 on the upper ends thereof. Plate 16, as shown in FIG. 3, occupies an elevated position relative to base G and is substantially parallel thereto.

First, second and third shafts 18, 20 and 22 are provided. The first and third shafts 18 and 22 are stub shafts of the same structure. The first and third shafts 18 and 22 have lower, externally threaded portions of smaller diameter that extend downwardly through openings in the base G to be engaged by nuts 24.

First, second, third, fourth, fifth, sixth, seventh and eighth gears 26, 28, 30, 32, 34, 36, 38 and 40, respectively, are provided as shown in FIGS. 3 and 5. First, sixth and eighth gears 26 36 and 40 are mounted on first shaft 18. Second, third, fifth and seventh gears, 28, 30, 34 and 38 are mounted on second shaft 20. Fourth gear 32 that is an idler gear is rotatably supported on third shaft 22, as shown in FIG. 5.

First gear 26 has a weight 42 of substantial magnitude eccentrically mounted thereon as shown in FIGS. 3 and 4. First and second ratchet mechanisms 44 and 46 are interposed between second shaft 20 and second and third gears 28 and 30 that allow these gears to rotate in both first and second directions, but to drive second shaft 20 only when gears 28 or 30 rotate in a first direction.

First gear 26 is rotatably supported on first shaft 18 by first and second bearings 48 and 50, as shown in FIG. 3. First bearing 48 is preferably a thrust bearing whereby the eccentrically weighted first gear 26 is rotatably supported on first shaft 18 in a manner to have a minimum of friction as it oscillates thereon, as will later be explained. First gear 26, as may be seen in FIG. 3, is of far greater diameter than that of second gear 28. First and second gears 26 and 28 are in toothed engagement. Third and fourth gears 30 and 32 may be of substantially the same diameter. Fourth gear 32 is in toothed engagement with both first gear 26 and third gear 30. When first gear 26 rotates in a second direction, this motion is transferred through fourth gear 32 to rotate third gear 30 in a first direction. Rotation of either second gear 28 or third gear 30 in a first direction serves to impart like movement to second shaft 20 due to first and second ratchet mechanisms 44 and 46.

Fifth gear 34 is, by a conventional key 49 or other fastening means, rigidly secured to second shaft 20. The fifth gear 34 is of substantially greater diameter than second gear 28. Fifth gear 34 is in engagement with an externally toothed hub 36a that forms a part of sixth gear 36, as shown in FIG. 3. Sixth gear 36 is rotatably supported on first shaft 18 by a bearing assembly 50 as shown in FIG. 3. The sixth gear 36 that is of substantially the same diameter as fifth gear 34 is in engagement with an externally toothed hub 38a that forms a part of seventh gear 38. The seventh gear 38 that is of substantially the same diameter as sixth gear 36 is in toothed engagement with eighth gear 40. Seventh gear 38 is rotatably supported on second shaft 20 by two bearing assemblies 52.

The eighth gear 40 that is in toothed engagement with seventh gear 38 is rotatably supported on first shaft 18 by a bearing assembly 54. A fourth shaft 56 extends upwardly from eighth gear 40. Fourth shaft 56 is rotatably supported in a fixed position by a bearing assembly 58 supported by plate 16. The upper end portion of second shaft 20 is rotatably supported by a bearing assembly 60 supported from plate 16.

An inverted cover or housing 62 is removably secured to base G by conventional means (not shown). The housing 62 serves to enclose first, second and third shafts 18, 20 and 22, first to eighth gears 26 to 40 inclusive, and plate 16. Housing 62 serves as a support for alternator D, which alternator has a driving shaft 64 extending therefrom that is rigidly connected to eighth gear 40 by a coupling 66, as shown in FIG. 3. First gear 26 is preferably formed from a non-magnetic material, as is weight 42, to eliminate the possibility of the oscillating weight having an adverse effect on a compass that may be mounted on the vessel A. Weight 42 is preferably of semi-circular shape, as shown in FIG. 4. Weight 42 may have cavities 68 formed therein that have molten lead poured therein to increase the magnitude of the weight.

Second, third, fourth, fifth, sixth and eighth gears 28, 30, 32, 34, 36 and 40, respectively, are preferably formed from a tough polymerized resin such as nylon or the like to minimize the weight of the invention B. First gear 26 has a tooth-defining ring 26a formed of a polymerized resin bonded thereto and disposed in a circular recess formed in the body of the gear. Toothed ring 26a is in engagement with second and fourth gears 28 and 32 and, as a result, the wear on ring 26a and gears 28 and 32 will be uniform as they rotate.

Figure 10:
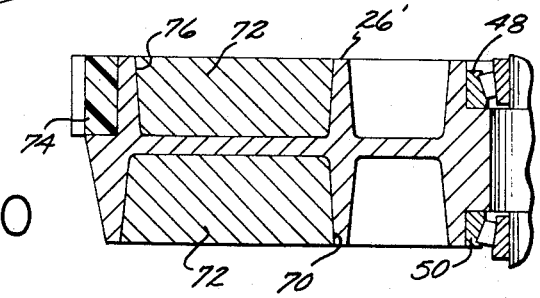
FIG. 10 is a fragmentary transverse cross-sectional view of an alternate form of eccentrically weighted oscillating gear.
Figure 8:
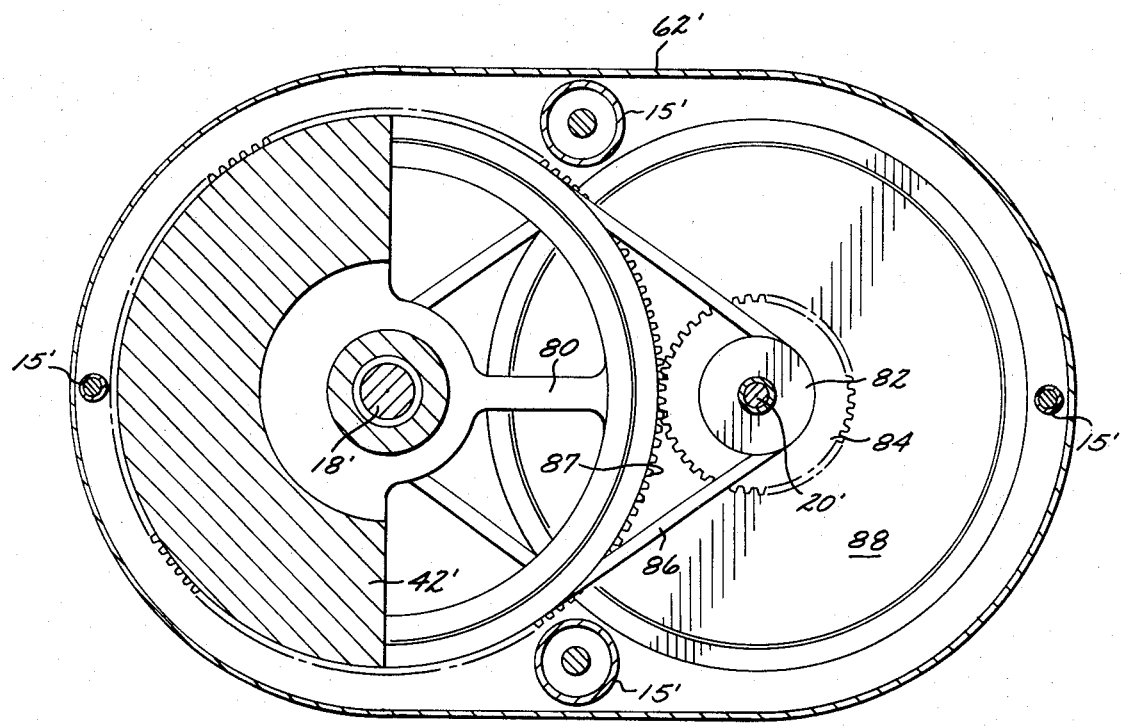
FIG. 8 and FIG. 9 are longitudinal cross-sectional views of the second form of the device taken on the lines 8—8 and 9—9, respectively, of FIG. 7.
Figure 9:
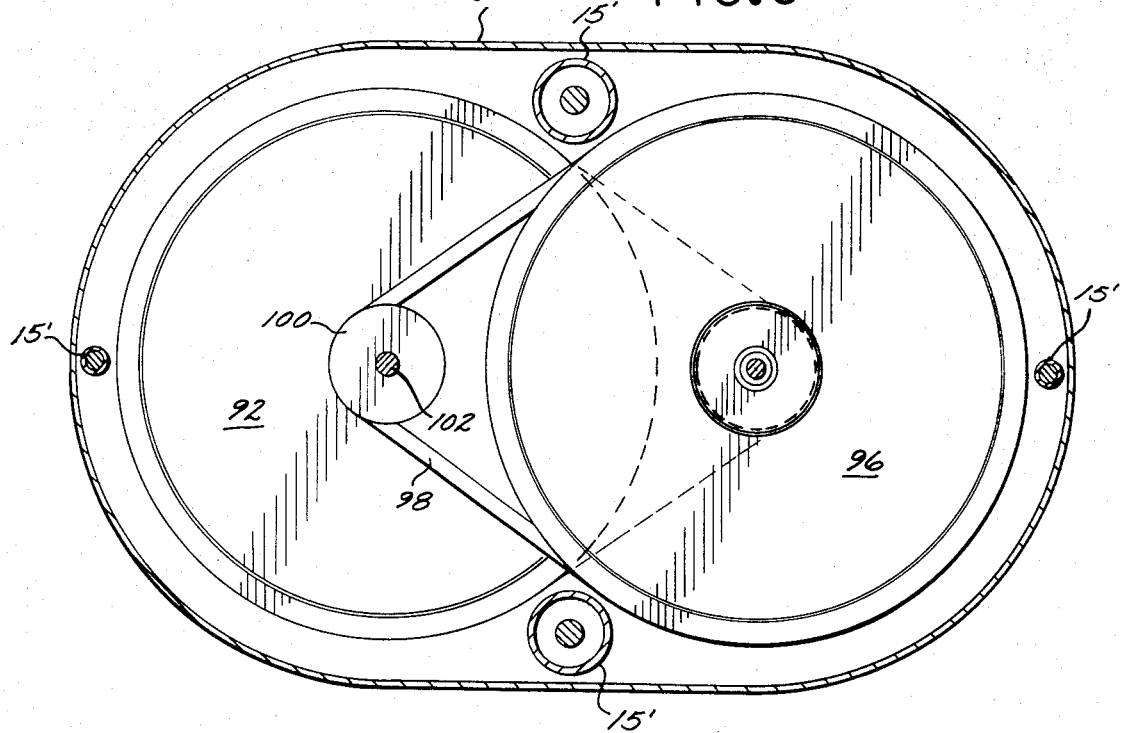

Seventh gear 38 is preferably formed from steel or the like. The seventh gear 38, due to the weight thereof, acts as a flywheel to smooth out the rotary motion delivered by it to eighth gear 40. Eighth gear 40 is also formed from the same material as seventh gear 38 in order that there be uniform wear on the two gears as they rotate. An alternate first gear 26' is shown in FIG. 10 that includes a hub 68 that has an eccentric compartment defining frame 70 extending outwardly therefrom, with the compartments being filled with lead 72 to increase the weight thereof. Gear 26' has a tooth-defining ring 74 of a polymerized resin inserted in a circular recess 76 formed therein, with the ring being bonded to the body of the gear.

After the invention B is installed in a vessel A, as previously described, and the vessel A moves with pitch and roll motion due to wave or tide action, the eccentrically weighted first gear 26 oscillates. Rotary motion of first gear 26 in a first direction drives second gear 28 in the same direction to rotate second shaft 20 and fifth gear 34. Fifth gear 34, as it rotates in a first direction, drives sixth, seventh and eighth gears 36, 38 and 40 at increasing rates of rotation, with the fourth shaft 56 which is connected to eighth gear 40 being driven at a sufficiently high rate of rotation that the alternator D is actuated to generate an electric current that flows through conductors E to batteries F to charge the latter.

When the eccentrically weighted first gear 26 oscillates in a second direction, third gear 30 is driven by fourth gear 32 to rotate in a first direction and drive second shaft 20 in a first direction. Fifth gear 34 serves to transmit rotary motion to sixth gear 36 in a single direction irrespective of whether second shaft 20 is rotated in a first direction by second gear 28 or third gear 30.

An alternate form B' of the invention is shown in FIG. 7 that serves the same purpose as the first form B previously described, and both forms include certain common elements. Elements in alternate form B' that are common to the first form B of the invention are identified by the number or letter used in describing the first form but with a prime added thereto. The alternate form B' of the invention differs from the first form B primarily in being of belt-driven construction rather than of the gear driven type.

The alternate form B' includes a base G' that has uprights 15' secured thereto that support a plate 16'. A first stub shaft 18' extends upwardly from base G'. The base G' and plate 16' rotatably support a second shaft 20' therebetween.

A first sheave 80 that has a weight 42' eccentrically mounted thereon is rotatably supported on first shaft 18'. A second sheave 82 and second gear 84 are mounted on second shaft 20'. A first endless belt 86 engages the first and second sheaves 80 and 82. The first sheave 80 has a first ring gear 87 rigidly secured thereto that is in toothed engagement with second gear 84. Second shaft 20' has a third sheave 88 keyed thereto. Third sheave 88 is engaged by a second endless belt 90 that also engages a fourth double sheave 92 rotatably supported on first shaft 18'. A third endless belt 94 extends from fourth double sheave 92 to engage a fifth double sheave 96 rotatably supported on second shaft 20'.

Fifth double sheave 96 is drivingly connected by a fourth endless belt 98 to a sixth shave 100 that is rotatably supported on first shaft 18'. The sixth sheave 100 has a third shaft 102 extending upwardly therefrom that is drivingly connected to alternator D' in the same manner as shaft 64 in the first form B of the invention. Bearing assemblies 104, 106 and 109 rotatably support first, fourth and sixth sheaves 80, 92 and 100, respectively, on first shaft 18'. Second shaft 20' is rotatably supported by bearing assemblies 110 between base G' and plate 16'. Fifth sheave 96 is rotatably supported on second shaft 20' by bearing assemblies 110.

Second sheave 82 and second gear 84 have ratchet mechanisms 112 and 114 interposed between them and second shaft 20' that permits the second sheave 82 and second gear 84 to drive the second shaft 20' only when the second sheave 82 and second gear 84 rotate in a first direction. When first sheave 80 oscillates in a first direction, the first belt 86 drives second shaft 20' in a first direction to rotate third sheave 88. Rotation of third sheave 88 in a first direction results in the alternator D' being driven in a first direction due to rotation of second, third and fourth belts 90, 94 and 98, and fourth, fifth and sixth sheaves 92, 96 and 100.

Upon first sheave 80 oscillating in a second direction, the second gear 84 is driven in a second direction to rotate second shaft 20' in a first direction. The second shaft 20' now drives the alternator D' in the same direction and in the same direction as previously described when rotation of shaft 20' was due to the action of second sheave 82.

The use and operation of the two forms of the device B and B' has been previously described in detail and need not be repeated. In both the first and alternate forms of the device B and B' the motive power is furnished by the off-centered weights oscillating through an arcuate path as the vessel A on which either device is mounted is subjected to pitch and roll motion by wave action.

Although the invention has been described and illustrated as driving an alternator D to charge storage batteries F, it will be apparent that a conventional rotary pump (not shown) may be substituted for the alternator, and a conventional pressure vessel for the storage batteries. The pump, as it is rotated, will discharge a gaseous medium such as air to the pressure vessel where it is stored at a greater than ambient pressure for future use as a source of energy. The pump and pressure vessel are connected by conventional piping (not shown).

I claim:

1. A device for use in transforming the pitch and roll motion of a buoyant marine structure into storage battery contained electrical energy for future use, said device including:
   a. a base;
   b. first means for securing said base in a fixed position relative to said structure;
   c. a rigid plate;
   d. second means for holding said plate at a fixed elevated position above said base and substantially parallel thereto;
   e. first, second and third spaced shafts normally disposed to said base and situated between said base and plate, said first and third shafts being stub shafts supported from said base, and said second shaft having the end portions thereof rotatably supported by said base and plate;
   f. first, second, third, fourth, fifth, sixth, seventh, and eighth gears, said first, sixth and eighth gears being rotatably supported on said first shaft, said second, third, fifth and seventh gears mounted on said second shaft but only said seventh gear being rotatable in two opposite directions relative thereto, said fifth gear being keyed to said second shaft, said sixth and seventh gears including externally toothed hubs that are engaged by said fifth and sixth gears, said fourth gear being rotatably supported on said third shaft and in engagement with both said first gear and said third gear, said first gear being in engagement with said second gear and said seventh gear in engagement with said eighth gear, said first, fifth, sixth and seventh gears being of substantially greater diameter than said second gear;
   g. third and fourth means interposed between said second shaft and said second and third gears for allowing said second and third gears to rotate in first and second opposite directions, but with said third and fourth means permitting said second and third gears to drive said second shaft and fifth gear only when said second or third gear rotates in a first direction, said second gear rotating in said first direction when said first gear so rotates, and said third gear rotating in said first direction when said first gear rotates in a second direction;
   h. a weight eccentrically supported on said first gear that oscillates said first gear in first and second directions as said structure pitches and rolls, with said oscillating movement of said first gear being transformed into rotational movement of said second shaft in a single direction by said second and third gears and said third and fourth means, and said fifth gear transferring said rotary motion of said second shaft to said eighth gear through driving rotation of said sixth and and seventh gears;
   i. fifth means for generating an electric current when a shaft that forms a part thereof is rotated, said fifth means occupying a fixed position relative to said plate;
   j. sixth means for connecting said shaft of said fifth means to said eighth gear to drive said shaft of said fifth means in a single direction as said first gear oscillates, with said seventh gear being of sufficient weight to act as a flywheel to minimize variations in the rate of rotation of said shaft of said fifth means; and
   k. electrical conducting means through which an electrical current generated by said fifth means flows to charge storage battery means as a future source of stored electrical energy.

2. A device as defined in claim 4 that further includes:
   1. a protective housing removably secured to said base to enclose said first to eighth gears inclusive and also serve as a support for said fifth means.

3. A define as defined in claim 4 in which said second means are a plurality of spaced uprights that occupy fixed positions relative to said base and secured thereto, with said plate removably secured to the ends of said upright most remote from said base.

4. A device as defined in claim 4 in which said weight is formed from a non-magnetic material to prevent the oscillation of said weight having an adverse effect on a compass that may be mounted on said structure.

5. A device as defined in claim 4 in which said third and fourth means are ratchet mechanisms.

6. A device as defined in claim 4 in which said fifth means is an alternator that includes a rotatable fourth shaft that is operatively connected to said eighth gear by said sixth means.

7. A device as defined in claim 4 in which said seventh gear is of sufficient size and weight to act as a flywheel and smooth out the rotational energy delivered by said seventh gear to said eighth gear due to the oscillation of said first gear.

8. A device for use in transforming the pitch and roll motion of a buoyant marine structure into storage battery contained electrical energy for future use, said device including:
  a. a base;
  b. first means for securing said base in a fixed position relative to said structure;
  c. a rigid plate;
  d. second means for holding said plate at a fixed elevation above said base and substantially parallel thereto;
  e. first and second shafts normally disposed to said base and situated between said base and plate, said first shaft being a stub shaft supported from said base, and said second shaft having the end portions thereof rotatably supported by said base and plate;
  f. first, second, third, fourth, fifth and sixth sheaves, said first, fourth and sixth sheaves rotatably supported on said first shaft and said second, third and fifth sheaves mounted on said second shaft, said third sheave keyed to said second shaft, and said fifth sheave being freely rotatable on said second shaft;
  g. a ring gear supported from said first sheave;
  h. a first gear mounted on said second shaft and in engagement with said ring gear; i. first, second, third and fourth endless belts, said first belt drivingly engaging said first and second sheaves, said second belt drivingly engaging said third and fourth sheaves, said third belt drivingly engaging said fourth and fifth sheaves, and said fourth belt drivingly engaging said fifth and sixth sheaves;
  j. a non-magnetic weight eccentrically supported on said first sheave that oscillates said first sheave in opposite directions as said structure pitches and rolls;
  k. third and fourth means interposed between said second shaft and said first gear and said second sheave for allowing said first gear and second sheave to rotate in first and second directions, but said third and fourth means permitting said first gear and second sheave to drive said second shaft only in a first direction when said second sheave and first gear rotate in said first direction, said second sheave rotating in said first direction when said first sheave so rotates, and said first gear rotating in said first direction when said first sheave rotates in a second direction due to the pitch and roll of said structure;
  l. fifth means for generating an electric current when a shaft that forms a part thereof is rotated, said fifth means occupying a fixed position relative to said plate;
  m. sixth means for connecting said shaft of said fifth means to said sixth sheave to drive said shaft of said fifth means in a single direction as the weight supporting first sheave oscillates and transmits rotary motion in a single direction through said second to fifth sheaves inclusive and said first gear to said sixth sheave;
  n. storage battery means on said structure; and o. electrical conducting means through which electric energy generated by said fifth means flows to storage battery means on said structure for future use.

9. A device as defined in claim 8 that further includes:
  p. a protective housing removably secured to said base to enclose said first and sixth sheaves inclusive, said first gear, and said first, second and third belts, and also serve as a support for said fifth means.

10. A device as defined in claim 8 in which said second means are a plurality of spaced uprights that occupy fixed positions relative to said base and secured thereto, with said plate removably secured to the ends of said uprights most remote from said base.

11. A device as defined in claim 8 in which said third and fourth means are ratchet mechanisms.

12. A device as defined in claim 8 in which said weight is formed from a non-magnetic material to prevent the oscillation of said weight having an adverse effect on a compass that may be mounted on said structure.

13. A device as defined in claim 8 in which said fifth means is an alternator that includes a rotatable shaft that is operatively connected to said sixth sheave by said sixth means.

* * * * *